US011904931B2

(12) United States Patent
Watanabe et al.

(10) Patent No.: US 11,904,931 B2
(45) Date of Patent: Feb. 20, 2024

(54) STEERING SYSTEM

(71) Applicant: JTEKT CORPORATION, Osaka (JP)

(72) Inventors: Takeshi Watanabe, Kashihara (JP); Yasuyuki Nozawa, Kashihara (JP); Kei Kitahara, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 590 days.

(21) Appl. No.: 17/146,592

(22) Filed: Jan. 12, 2021

(65) Prior Publication Data
US 2021/0213997 A1    Jul. 15, 2021

(30) Foreign Application Priority Data

Jan. 15, 2020  (JP) ................................ 2020-004106

(51) Int. Cl.
| | |
|---|---|
| *B62D 1/183* | (2006.01) |
| *B62D 1/181* | (2006.01) |
| *B62D 1/185* | (2006.01) |
| *B62D 5/00* | (2006.01) |
| *B62D 5/04* | (2006.01) |
| *B62D 6/00* | (2006.01) |

(Continued)

(52) U.S. Cl.
CPC ............. *B62D 1/183* (2013.01); *B62D 1/181* (2013.01); *B62D 1/185* (2013.01); *B62D 5/006* (2013.01); *B62D 5/0424* (2013.01); *B62D 6/00* (2013.01); *G01L 5/221* (2013.01); *G05D 3/20* (2013.01)

(58) Field of Classification Search
CPC ......... B62D 1/181; B62D 1/183; B62D 1/185
See application file for complete search history.

(56) References Cited

U.S. PATENT DOCUMENTS

2013/0161117 A1*  6/2013  Higashi .................. B62D 5/001
                                                                      180/446
2016/0347348 A1* 12/2016  Lubischer ............ G05D 1/0088
(Continued)

FOREIGN PATENT DOCUMENTS

| | | |
|---|---|---|
| EP | 3564093 A1 | 11/2019 |
| JP | 2019-077354 A | 5/2019 |
| JP | 2019-182054 A | 10/2019 |

OTHER PUBLICATIONS

Jul. 4, 2023 Office Action issued in Japanese Patent Application No. 2020-004106.
(Continued)

*Primary Examiner* — Kevin Hurley
*Assistant Examiner* — Hosam Shabara
(74) *Attorney, Agent, or Firm* — Oliff PLC

(57) ABSTRACT

A steering system configured to steer a vehicle includes a rotary shaft to which an operation member is coupled; a moving unit configured to move the operation member between a normal position that is a position where the operation member is operated by a driver, and a storage area located ahead of the normal position; an external force detection unit configured to detect an external force externally applied to the operation member while the operation member is moving; a determination unit configured to determine whether a direction of the external force detected by the external force detection unit is the same as a moving direction of the operation member; and a control unit configured to control operation of the steering system based on a determination result from the determination unit.

11 Claims, 10 Drawing Sheets

(51) Int. Cl.
    *G01L 5/22*         (2006.01)
    *G05D 3/20*        (2006.01)

(56)               References Cited

U.S. PATENT DOCUMENTS

| | | | |
|---|---|---|---|
| 2017/0029018 A1* | 2/2017 | Lubischer | B62D 1/28 |
| 2018/0154932 A1 | 6/2018 | Rakouth et al. | |
| 2018/0273081 A1* | 9/2018 | Lubischer | B62D 1/19 |
| 2019/0118852 A1 | 4/2019 | Suzuki et al. | |
| 2019/0308655 A1 | 10/2019 | Ochi et al. | |
| 2019/0308662 A1* | 10/2019 | Christiansen | B62D 1/183 |
| 2020/0339176 A1* | 10/2020 | Cao | B62D 1/183 |
| 2020/0339179 A1* | 10/2020 | Nozawa | B62D 1/192 |
| 2021/0016820 A1* | 1/2021 | Nozawa | B62D 1/189 |
| 2021/0031822 A1* | 2/2021 | Watanabe | B62D 1/187 |
| 2021/0124349 A1* | 4/2021 | Koehler | B62D 1/185 |
| 2021/0214003 A1* | 7/2021 | Watanabe | B62D 5/006 |
| 2021/0323598 A1* | 10/2021 | Watanabe | B62D 1/181 |

OTHER PUBLICATIONS

Jun. 9, 2021 Search Report issued in European Patent Application No. 21151337.9.

\* cited by examiner

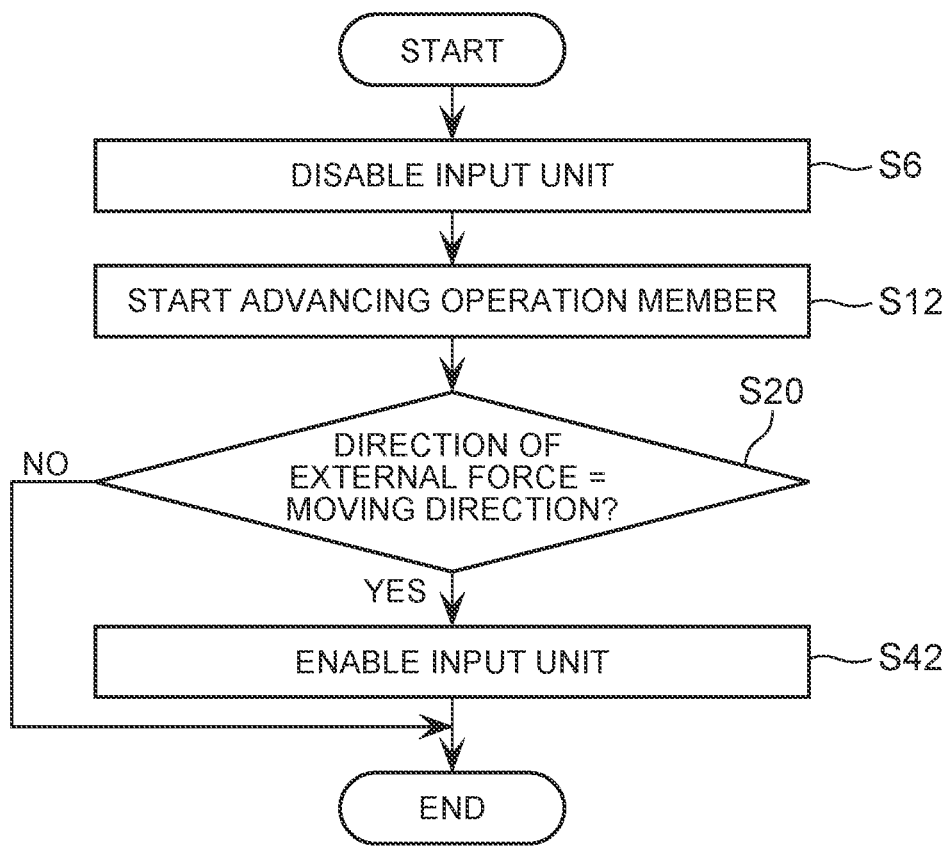

STEERING SYSTEM

CROSS-REFERENCE TO RELATED APPLICATION

This application claims priority to Japanese Patent Application No. 2020-004106 filed on Jan. 15, 2020, incorporated herein by reference in its entirety.

BACKGROUND

1. Technical Field

The disclosure relates to a steering system capable of increasing the space in front of a driver by moving an operation member such as a steering wheel.

2. Description of Related Art

At autonomous driving level 3 or higher at which a system is responsible for autonomous driving of a vehicle, a driver need not be responsible for the operation of the vehicle and therefore need not hold a steering wheel. Accordingly, driver's comfort is increased if the steering wheel is moved to create a large space in front of the driver during autonomous driving. For example, Japanese Unexamined Patent Application Publication No. 2019-77354 (JP 2019-77354 A) discloses a vehicle operation system capable of moving a driving operator that is a steering wheel. This vehicle operation system includes the driving operator that accepts an operation performed by an occupant and a control unit that controls a holding mechanism for the driving operator so that the driving operator is stored by changing the state of the holding mechanism based on the state of autonomous driving that is performed in a vehicle.

SUMMARY

A steering system that moves a steering wheel (operation member) like the vehicle operation system in the related art includes, e.g., a mechanism that stops the operation member when some external force is applied to the operation member while the operation member is moving. When an external force is detected while the operation member is moving, this system in the related art determines that the operation member has come into contact with a driver and stops the operation member in order to improve the driver's safety.

The cases where the driver contacts the moving operation member include a case where the driver contacts the moving operation member with some intention, for example, the intention to operate the operation member as soon as possible, in addition to a case where the driver contacts the moving operation member unintentionally. In the case where the driver contacts the moving operation member with some intention, stopping the operation member may require unnecessary control of the operation of the steering system. For example, stopping the operation member may require performing a process related to movement of the operation member again.

The disclosure provides a steering system which can increase the space in front of a driver and whose operation can be efficiently controlled.

An aspect of the disclosure relates to a steering system configured to steer a vehicle. The steering system includes a rotary shaft to which an operation member is coupled; a moving unit configured to move the operation member between a normal position that is a position where the operation member is operated by a driver, and a storage area located ahead of the normal position; an external force detection unit configured to detect an external force externally applied to the operation member while the operation member is moving; a determination unit configured to determine whether a direction of the external force detected by the external force detection unit is the same as a moving direction of the operation member; and a control unit configured to control operation of the steering system based on a determination result from the determination unit.

According to the above aspect of the disclosure, it is possible to provide the steering system which can increase the space in front of the driver and whose operation can be efficiently controlled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a flowchart illustrating a seventh example of the specific operation of the steering system according to the embodiment.

DETAILED DESCRIPTION OF EMBODIMENTS

Figure 1:
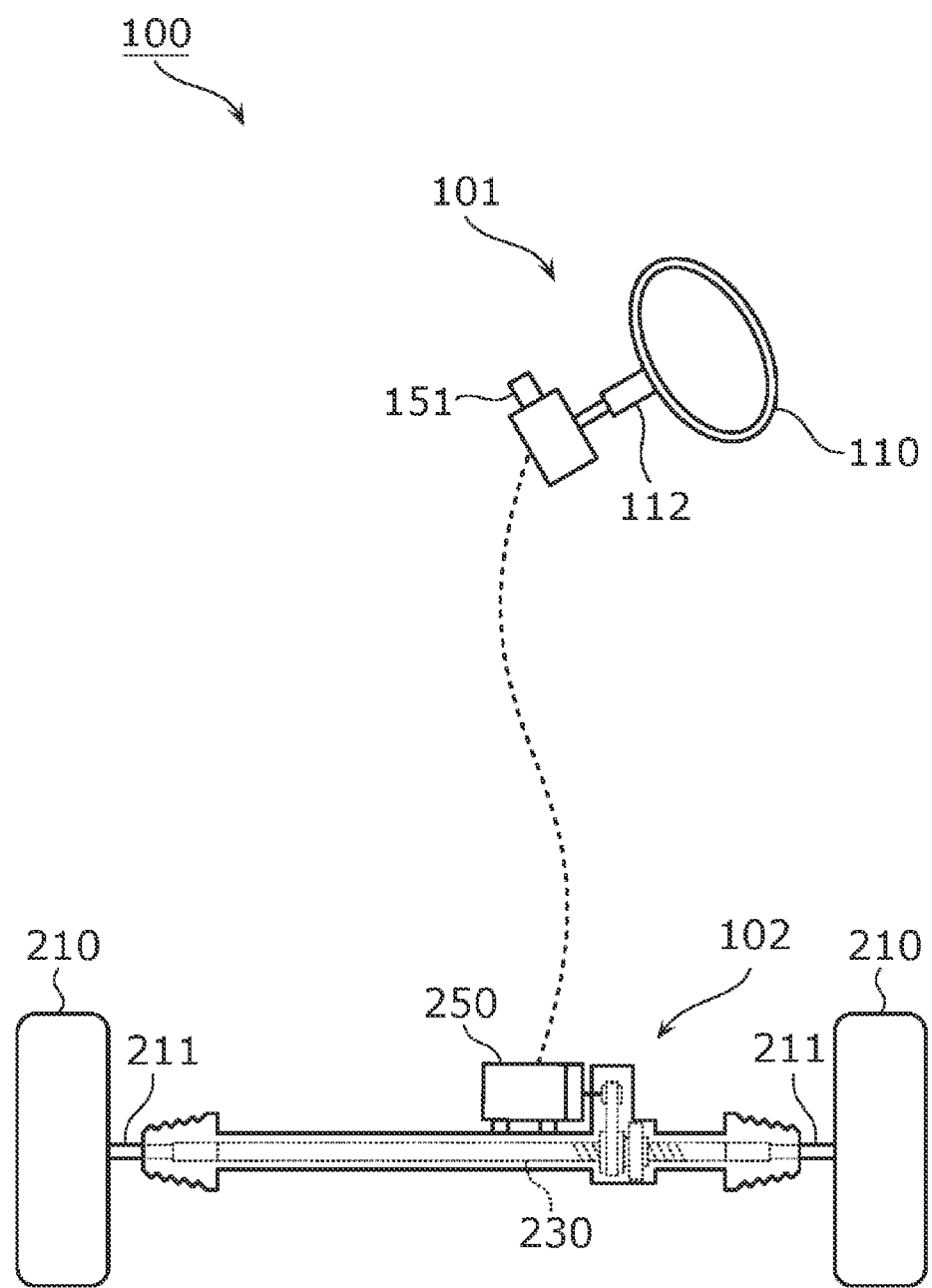
FIG. 1 illustrates a schematic configuration of a steering system according to an embodiment.

Embodiments of a steering system according to the disclosure will be specifically described with reference to the accompanying drawings. The embodiments described below illustrate comprehensive or specific examples. The numerical values, shapes, materials, components, positions and connections of the components, steps, order of steps, etc.

shown in the following embodiments are merely examples and are not intended to limit the disclosure.

The drawings are schematic views with components being emphasized, omitted, or adjusted in proportion as appropriate in order to illustrate the disclosure, and the shapes, positional relationships, and proportions in the drawings may be different from the actual shapes, positional relationships, and proportions. In the following embodiments, expressions indicating relative directions or attitudes such as parallel and perpendicular are sometimes used. These expressions include the case where the relative directions or attitudes are not exactly the indicated directions or attitudes. For example, two directions being parallel not only means that the two directions are exactly parallel, but also means that the two directions are substantially parallel, that is, the two directions are nearly parallel within, e.g., about several percent differences.

Embodiment

1. Mechanical Configuration of Steering System

Figure 2:
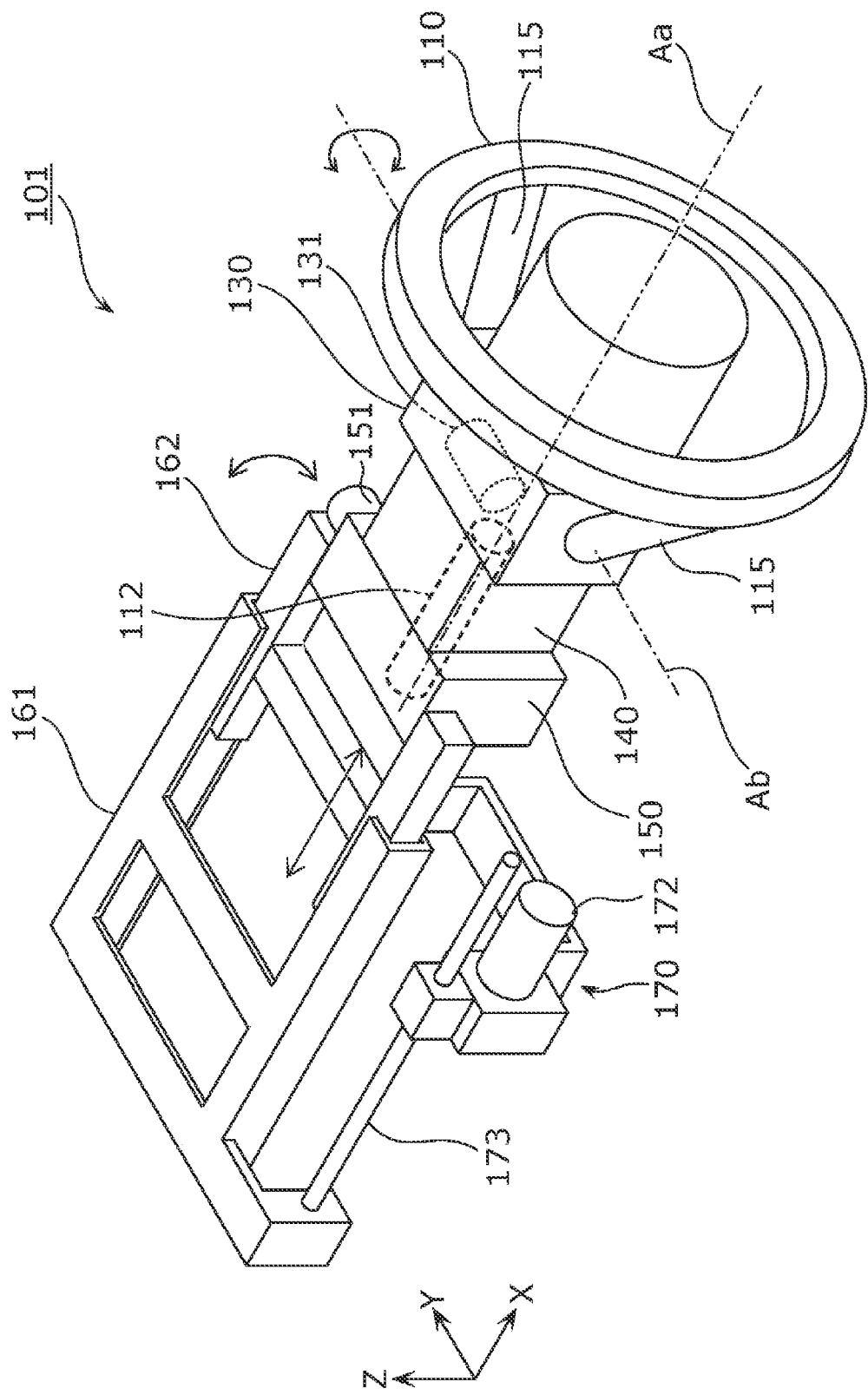
FIG. 2 is a perspective view illustrating the appearance of a steering mechanism unit included in the steering system according to the embodiment.

FIG. 1 illustrates a schematic configuration of a steering system 100 according to an embodiment. FIG. 2 is a perspective view illustrating the appearance of a steering mechanism unit 101 included in the steering system 100 according to the embodiment.

The steering system 100 according to the embodiment is a system that is mounted on vehicles such as passenger vehicles, buses, trucks, construction equipment, or agricultural machines capable of switching between a manual drive mode and an autonomous drive mode.

As shown in FIG. 1, the steering system 100 includes the steering mechanism unit 101 including an operation member 110 that is operated by a driver, and a steering operation mechanism unit 102 that steers steered wheels 210. The steering system 100 is a so-called steer-by-wire (SBW) system in which the rotation angle, etc. of the operation member 110 are read with a sensor, etc. and the steered wheels 210 are steered by a shaft 230 reciprocating in the lateral direction of the vehicle (right-left direction in FIG. 1) based on signals from the sensor, etc, in the manual drive mode, for example.

In the steering mechanism unit 101 located upstream in such operations and processes related to steering of the vehicle, a rotary shaft 112 is coupled to the operation member 110, and the rotary shaft 112 is configured to receive a rotational driving force of a first actuator 151. The operation member 110 is subjected to a reaction force by the rotational driving force of the first actuator 151 when the driver operates the operation member 110. The rotational driving force of the first actuator 151 is also used to synchronize the rotational position of the operation member 110 with the steered angle of the steered wheels 210. An example of operation control using the first actuator 151 will be described later with reference to FIG. 11, etc.

In the steering operation mechanism unit 102 located downstream of the steering mechanism unit 101, the steered wheels 210 connected to the shaft 230 via tie rods 211 are steered when the shaft 230 moves in the lateral direction (width direction) of the vehicle (right-left direction in FIG. 1). Specifically, in the manual drive mode, a second actuator 250 operates based on signals indicating the rotation angle, etc. of the operation member 110 that are sent from the steering mechanism unit 101. As a result, the shaft 230 moves in the lateral direction of the vehicle, and the steered wheels 210 are steered accordingly. That is, the steered wheels 210 are steered according to the operation of the operation member 110. In the autonomous drive mode, the second actuator 250 operates based on signals, etc. that are sent from a computer (not shown) for autonomous driving mounted on the vehicle. The steered wheels 210 are thus steered without depending on the operation of the operation member 110.

More specifically, in the steering system 100 configured as described above, the steering mechanism unit 101 includes support members 115 that support the operation member 110 and a rotation mechanism unit 130, as shown in FIG. 2. For example, in the embodiment, the operation member 110 is a member corresponding to a rim of a steering wheel, and the support members 115 are members corresponding to spokes of the steering wheel.

The operation member 110 is rotated about a steering axis Aa (imaginary axis extending in the longitudinal direction of the vehicle, the imaginary axis extending in parallel with the X axis in the embodiment) when operated by the driver, and the rotary shaft 112 coupled to the operation member 110 is also rotated about the steering axis Aa accordingly. In the manual drive mode, the one or more steered wheels 210 of the vehicle are steered as described above based on the amount of this rotation, etc.

The operation member 110 is supported by the support members 115 extending from the rotation mechanism unit 130. For example, the support members 115 are respectively located on both sides in the vehicle lateral direction (Y-axis direction in the embodiment) of the rotation mechanism unit 130 when the steered wheels 210 are in a neutral state, namely in a straight ahead state where the steered wheels 210 face the straight ahead direction. When the operation member 110 is rotated about the steering axis Aa, the rotation mechanism unit 130 is also rotated about the steering axis Aa accordingly. The rotary shaft 112 with its one end fixed to the rotation mechanism unit 130 is also rotated with the rotation of the operation member 110. That is, in the embodiment, the rotary shaft 112 is coupled to the operation member 110 via the rotation mechanism unit 130.

The rotation mechanism unit 130 is a device that rotates the support members 115 about a rotation axis Ab extending in the lateral direction of the vehicle. The rotation mechanism unit 130 includes a rotation motor 131 configured to rotate the support members 115, etc. When the support members 115 are rotated about the rotation axis Ab by the driving force of the rotation mechanism unit 130, the operation member 110 supported by the support members 115 is also rotated about the rotation axis Ab accordingly.

The operation member 110 is rotated along with the operation of advancing or retracting the operation member 110. For example, when the operation mode is switched from the manual drive mode to the autonomous drive mode, the operation member 110 is stored in a storage area (not shown) in a dashboard (an example of a vehicle member) located in front of the driver's seat. At this time, the operation member 110 is collapsed so as to be parallel to the steering axis Aa. When the operation mode is switched from the autonomous drive mode to the manual drive mode, the operation member 110 is returned to its normal position. At this time, the operation member 110 is rotated about the rotation axis Ab to an attitude perpendicular to the steering axis Aa.

As shown in FIG. 2, the steering system 100 according to the embodiment further includes a switch holding unit 140 and a reaction force generating device 150 that are disposed on the front side (negative X-axis side) of the rotation mechanism unit 130. The switch holding unit 140 is a member that holds a switch configured to operate turn signals, etc., and the switch holding unit 140 is connected to a turn signal lever, etc. that is operated by the driver.

The reaction force generating device 150 is a device that applies torque against the force from the driver to the operation member 110 when the driver operates the operation member 110 for steering. The reaction force generating device 150 includes the first actuator 151, etc. The reaction force generating device 150 is a device that reproduces, as a reaction force, e.g., a force that is applied to an operation member during driving of a conventional vehicle in which tires (wheels) and the operation member are mechanically connected. That is, in the embodiment, one end of the rotary shaft 112 is fixed to the rotation mechanism unit 130, and the other end of the rotary shaft 112 inserted through the switch holding unit 140 is connected to the reaction force generating device 150. The reaction force generating device 150 applies the reaction force to the operation member 110 via the rotary shaft 112. The reaction force generating device 150 can also control the rotational position of the operation member 110 about the steering axis Aa. Specifically, in the case where the operation member 110 is stored (retracted) in the storage area when, e.g., the vehicle is stopped, the operation member 110 is operated in the manual drive mode to a neutral rotational position (initial rotational position) in which the steered wheels 210 are in the straight ahead state. Synchronous control is performed when the operation member 110 is subsequently advanced from the storage area to the normal position. In the synchronous control, the rotational position of the operation member 110 is controlled to the rotational position corresponding to the steered angle of the steered wheels 210 at that time. The first actuator 151 is used to rotate and drive the operation member 110 in the synchronous control. An example of the operation of the steering system 100 in the synchronous control will be described later with reference to FIG. 11.

The steering system 100 further includes a mechanism that changes the position and attitude of an integral mechanism unit including the operation member 110, the support members 115, the rotation mechanism unit 130, the switch holding unit 140, and the reaction force generating device 150. The distance between the operation member 110 and the driver can thus be changed.

Specifically, as shown in FIG. 2, the steering system 100 includes a moving unit 170 that moves the steering mechanism unit 101 in the longitudinal direction (front-rear direction), i.e., the moving unit 170 changes the position of the steering mechanism unit 101 in the front-rear direction. In the embodiment, the moving unit 170 is a device that moves the operation member 110 by a sliding mechanism. Specifically, the integral mechanism unit including the operation member 110 is supported by a base guide 161 via a movable body 162, and the movable body 162 is slidably held by the base guide 161. The base guide 161 is fixed to the vehicle via, e.g., brackets, not shown. As shown in FIG. 2, a slide drive shaft 173 is fixed to the base guide 161, and a body of the moving unit 170, which includes a slide motor 172, is moved along the slide drive shaft 173 by the driving force of the slide motor 172 of the moving unit 170. The movable body 162 connected to the body of the moving unit 170 is thus moved in the longitudinal direction along the base guide 161. As a result, the operation member 110, the rotation mechanism unit 130, etc. are moved in the longitudinal direction. The steering system 100 may include a tilt mechanism unit that changes the tilt of the integral mechanism unit including the operation member 110.

2-1. Basic Functional Configuration and Operation of Steering System

Figure 3:
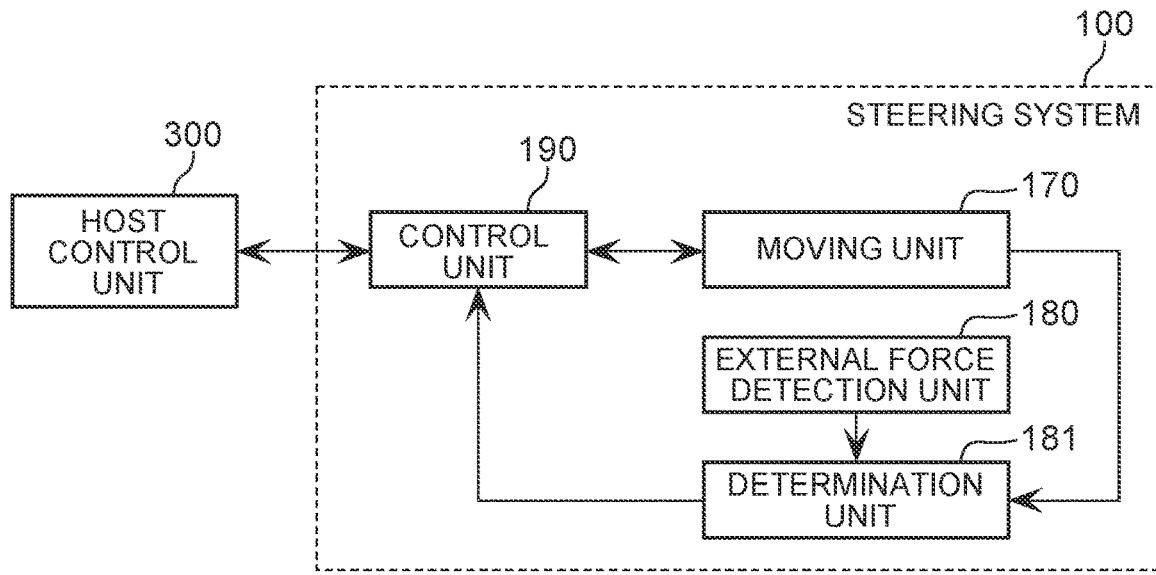
FIG. 3 is a block diagram illustrating a functional configuration of the steering system according to the embodiment.
Figure 4:
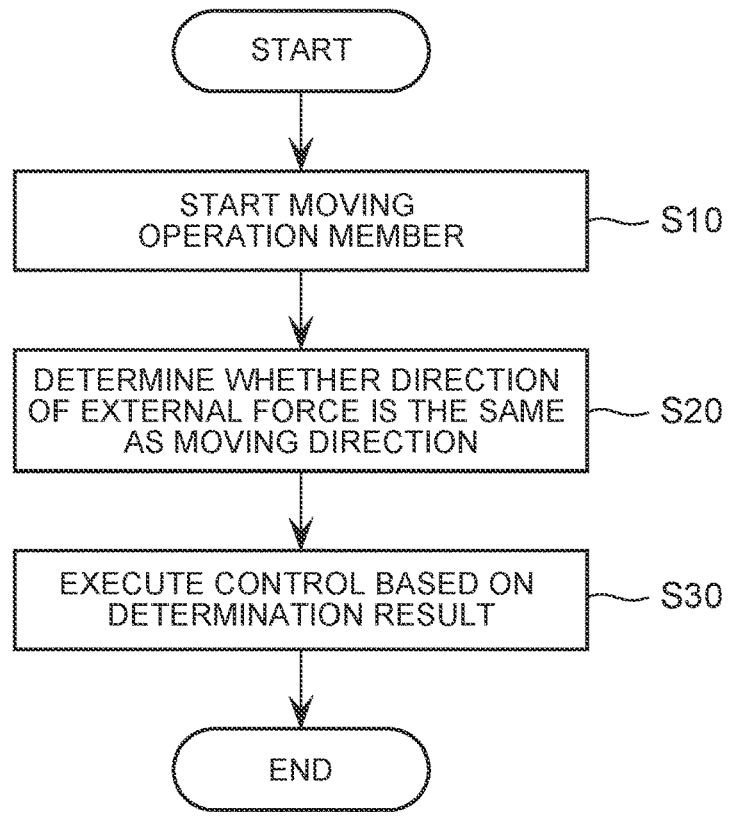
FIG. 4 is a flowchart illustrating a basic operation flow of the steering system according to the embodiment.

The functional configuration of the steering system 100 configured as described above will be described with reference to FIGS. 3 and 4. FIG. 3 is a block diagram illustrating a basic functional configuration of the steering system 100 according to the embodiment. FIG. 4 is a flowchart illustrating a basic operation flow of the steering system 100 according to the embodiment.

As shown in FIG. 3, the steering system 100 includes, as a basic configuration, the moving unit 170, a control unit 190, an external force detection unit 180, and a determination unit 181. As described above, the moving unit 170 moves the operation member 110 between the normal position that is a position where the operation member 110 is operated by the driver, and the storage area located ahead of the normal position. The external force detection unit 180 detects an external force that is externally applied to the operation member 110 while the operation member 110 is moving. The determination unit 181 determines whether the direction of the external force detected by the external force detection unit 180 is the same as the moving direction of the operation member 110. Specifically, the determination unit 181 determines, e.g., whether the direction of an axial component of the external force detected by the external force detection unit 180 is the same as the moving direction of the operation member 110. The direction of the axial component of the external force is along the moving direction of the operation member 110. The "direction of the external force that is applied to the operation member 110," which is compared with the moving direction of the operation member 110, means the direction of the axial component of the external force. That is, when the external force detection unit 180 detects an external force applied to the operation member 110, the external force detection unit 180 may output only the direction of the axial component of the external force to the determination unit 181.

The control unit 190 controls the operation of the steering system 100 based on the determination result of the determination unit 181. That is, the control unit 190 is a device that sends control signals to various devices in the steering system 100 including the moving unit 170. The control unit 190 also receives signals indicating the operation results or detection results from the various devices and generates control signals based on the received signals.

In the steering system 100 configured as described above, as shown in FIG. 4, the moving unit 170 operates according to, e.g., a predetermined operation performed by the driver or an instruction from a host control unit 300 (hereinafter referred to as the "predetermined operation, etc."). The moving unit 170 thus starts moving the operation member 110 (S10). When an external force including an axial component is applied to the operation member 110, the external force detection unit 180 detects the direction of the external force, and the determination unit 181 determines whether the direction of the external force is the same as the moving direction of the operation member 110 (S20). The control unit 190 acquires the determination result from the determination unit 181 and controls the operation of the steering system 100 based on the acquired determination result (S30).

As described above, in the steering system 100 according to the embodiment, when an external force is applied to the operation member 110 while the operation member 110 is moving, the operation of the steering system 100 is controlled according to whether the direction of the external force is the same as the moving direction of the operation member 110. That is, the driver can convey his or her intention, such as the intention (i.e., desire) to operate the operation member 110, etc. as soon as possible or the intention to return the operation member 110, etc. to its original position, to the steering system 100 by applying an external force to the operation member 110 by, for example, pulling or pushing the operation member 110 while the operation member 110 is moving. The steering system 100 can operate according to the driver's intention. The operation of the steering system 100 can thus be efficiently controlled.

The control unit 190 is implemented by a computer including, e.g., a central processing unit (CPU), a storage device such as a memory, an interface for inputting and outputting information, etc. For example, the control unit 190 can control the operation of the steering system 100 according to control signals sent from the host control unit 300, etc., detection results of sensors, etc. by executing a predetermined program stored in the storage device by the CPU.

The external force detection function of the external force detection unit 180 is implemented by, e.g., a device such as a sensor provided in the moving unit 170. The determination function of the determination unit 181 is implemented by, e.g., executing a determination program by the computer that implements the control unit 190. That is, the information processing functions of the functional blocks of the steering system 100 such as the control unit 190 and the determination unit 181 may be implemented by a single computer or separate computers. The same applies to the functional blocks for performing various kinds of information processing that will be described below.

2-2. Specific Operation Examples of Steering System

Figure 5:
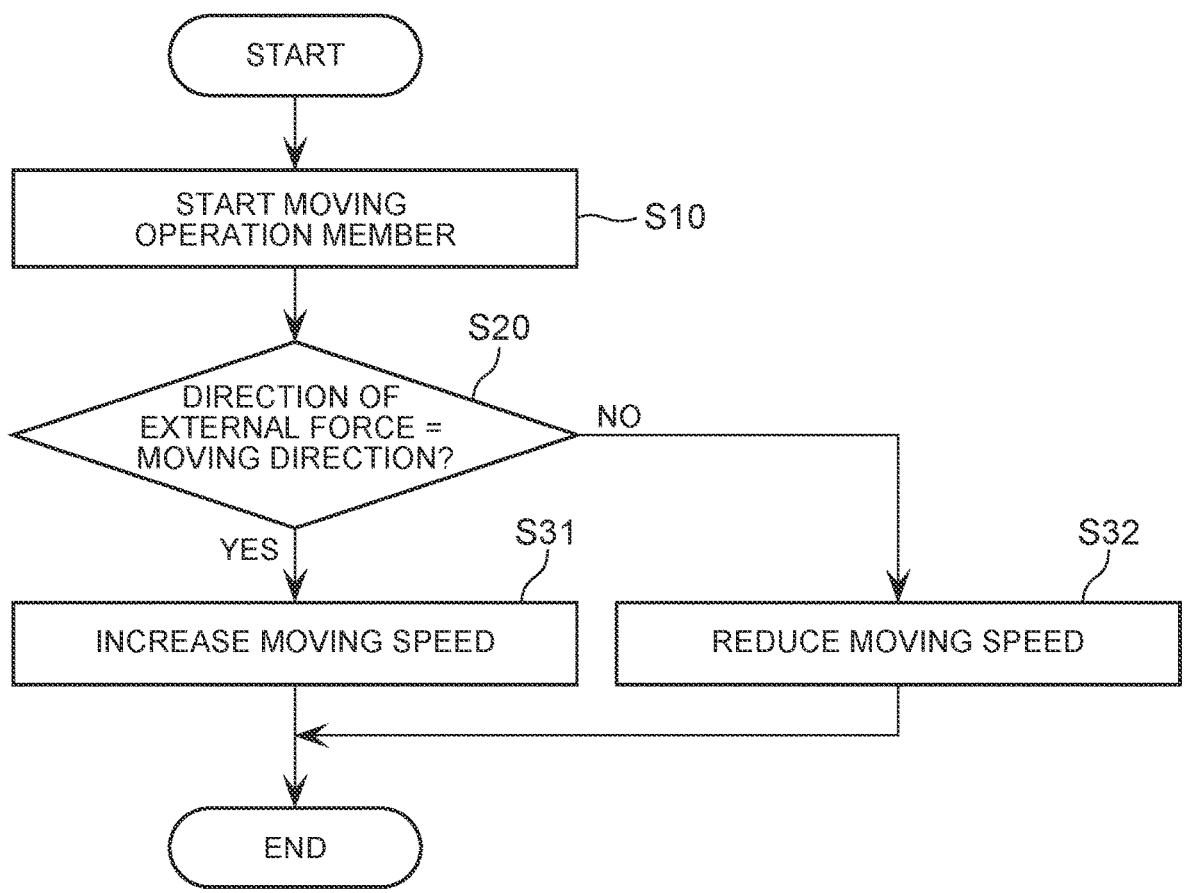
FIG. 5 is a flowchart illustrating a first example of a specific operation of the steering system according to the embodiment.
Figure 6:
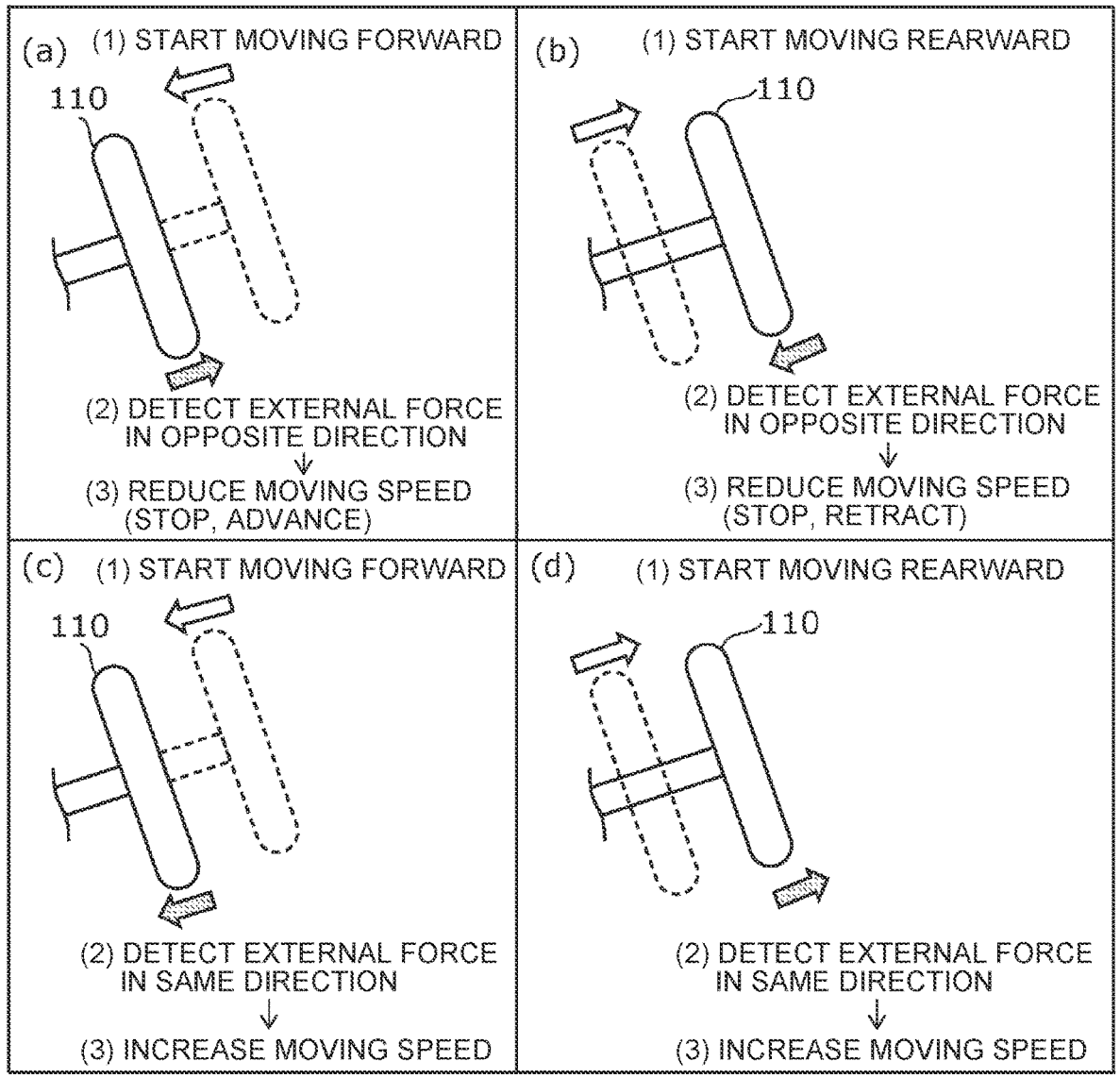
FIG. 6 schematically illustrates the states of the steering system regarding the operation shown in FIG. 5.

More specific operation examples of the steering system 100 having the basic configuration described above will be described with reference to FIGS. 5 to 7. FIG. 5 is a flowchart illustrating a first example of a specific operation of the steering system 100 according to the embodiment. FIG. 6 schematically illustrates the states of the steering system 100 regarding the operation shown in FIG. 5.

As shown in FIG. 5, in the steering system 100, the control unit 190 operates the moving unit 170 according to the predetermined operation, etc. The moving unit 170 thus starts moving the operation member 110 (S10). When the external force detection unit 180 detects an external force applied to the moving operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 controls the moving unit 170 to increase the moving speed of the operation member 110 (S31). When the determination unit 181 determines that the direction of the external force is not the same as the moving direction of the operation member 110 (No in S20), the control unit 190 controls the moving unit 170 to reduce the moving speed of the operation member 110 (S32).

That is, the control unit 190 controls the operation of the steering system 100 by controlling the movement of the operation member 110 based on the determination result of the determination unit 181. Accordingly, when the driver applies an external force to the operation member 110 by, e.g., pulling or pushing the operation member 110, the steering system 100 can control the movement of the operation member 110 according to the direction of the external force, namely according to the driver's intention.

It is assumed that, as shown in, e.g., (a) of FIG. 6, for example, when the operation mode is switched from the manual drive mode to the autonomous drive mode, an external force in the opposite direction (rearward direction) is applied to the operation member 110 that has started moving forward so as to be stored in the storage area. In this case, it is presumed that the driver pulls the retracting operation member 110 in the opposite direction, for example, because he or she wants to manually drive the vehicle. The control unit 190 therefore controls the moving unit 170 to reduce the forward moving speed of the operation member 110. For example, the control unit 190 changes the moving speed of the operation member 110 to a negative value. As a result, the moving speed of the operation member 110 that is moving forward (toward the storage area) is reduced to zero, and the operation member 110 then starts moving rearward and moves to the normal position. When the operation member 110 is returned to the normal position, the control unit 190 requests, e.g., the host control unit 300 to cancel the autonomous drive mode and switch to the manual drive mode. After the request is accepted, the control unit 190 enables steering with the operation member 110 (i.e., control of the steering operation mechanism unit 102 (see FIG. 1) according to the operation of the operation member 110).

It is assumed that, as shown in, e.g., (b) of FIG. 6, for example, when the manual drive mode is resumed or when driving of the vehicle is started, an external force in the opposite direction (forward direction) is applied to the operation member 110 that has started moving rearward so as to advance to the normal position. In this case, it is presumed that the driver pushes the advancing operation member 110 in the opposite direction, for example, because he or she wants to cancel the start of driving of the vehicle for now. The control unit 190 therefore controls the moving unit 170 to reduce the rearward moving speed of the operation member 110. For example, the control unit 190 changes the moving speed of the operation member 110 to a negative value. As a result, the moving speed of the operation member 110 that is moving rearward (toward the driver's seat) is reduced to zero, and the operation member 110 then moves forward and stops in the storage area. At this time, the control unit 190 notifies, e.g., the host control unit 300 of the cancellation of the start of the manual drive mode. For example, in the case where the vehicle is traveling in the autonomous drive mode and the host control unit 300 is notified by the control unit 190 of the cancellation of the start of the manual drive mode when the operation mode is switched from the autonomous drive mode to the manual drive mode, the host control unit 300 maintains the autonomous drive mode. In this case, for example, the host control unit 300 may perform control for, e.g., moving the vehicle to a safe position and stopping the vehicle at the safe position during a period in which the vehicle can travel in the autonomous drive mode. That is, in the case where the vehicle is traveling in the autonomous drive mode and the driver determines, when the operation mode is switched from the autonomous drive mode to the manual drive mode, that he or she cannot manually drive the vehicle for some reason, the vehicle can be moved to and stopped at the safe position by the driver pushing the operation member 110 that is being returned to the normal position.

It is assumed that, as shown in, e.g., (c) of FIG. 6, for example, when the operation mode is switched from the manual drive mode to the autonomous drive mode, an external force in the same direction (forward direction) is applied to the operation member 110 that has started moving forward so as to be stored in the storage area. In this case, it is presumed that the driver pushes the retracting operation member 110 in the retracting direction, for example, because he or she wants to move the operation member 110 away from him or her as soon as possible. The control unit 190 therefore controls the moving unit 170 to increase the forward moving speed of the operation member 110. The operation member 110 can thus be retracted to the storage area in a shorter time than when the operation member 110 is normally retracted to the storage area.

It is assumed that, as shown in, e.g., (d) of FIG. 6, for example, when the manual drive mode is resumed or when driving of the vehicle is started, an external force in the same direction (rearward direction) is applied to the operation member 110 that has started moving rearward so as to advance to the normal position. In this case, it is presumed that the driver pulls the advancing operation member 110 in the same direction, for example, because he or she wants to operate the operation member 110 with his or her hands as soon as possible. The control unit 190 therefore controls the moving unit 170 to increase the rearward moving speed of the operation member 110. The operation member 110 can thus be advanced to the normal position in a shorter time than when the operation member 110 is normally advanced to the normal position. At this time, the control unit 190 enables steering with the operation member 110 after, e.g., the host control unit 300 permits resuming or starting the manual drive mode.

When the moving direction of the operation member 110 is the same as the direction of the external force applied to the operation member 110 and the moving speed of the operation member 110 is increased, this increase in the moving speed of the operation member 110 is based on the driver's intention. It can therefore be said that it is unlikely that increasing the moving speed of the operation member 110 will cause unnecessary interference between the operation member 110 and the driver.

As described above, in the case where the determination result from the determination unit 181 indicates that the direction of the external force is not the same as the moving direction of the operation member 110 ((a) and (b) of FIG. 6), the control unit 190 according to the embodiment controls the operation of the steering system 100 by controlling the moving unit 170 to reduce the moving speed of the operation member 110. In the case where the determination result from the determination unit 181 indicates that the direction of the external force is the same as the moving direction of the operation member 110 ((c) and (d) of FIG. 6), the control unit 190 according to the embodiment controls the operation of the steering system 100 by controlling the moving unit 170 to increase the moving speed of the operation member 110. In each case, the operation member 110 can be moved to, e.g., the storage area or the normal position according to the driver's intention.

The operations illustrated in (a) to (d) of FIG. 6 may be performed in combination. For example, it is assumed that an external force in the forward direction is detected after the operation member 110 has started moving rearward due to an external force in the opposite direction (rearward direction) applied to the forward moving operation member 110 as shown in (a) of FIG. 6. In this case, the control unit 190 may control the moving unit 170 to reduce the moving speed of the operation member 110 and move the operation member 110 in the opposite direction so as to retract the operation member 110 in the storage area as shown in (b) of FIG. 6. That is, it is assumed that immediately after the driver pulls the retracting operation member 110 with the intention to execute the manual drive mode, he or she changes his or her mind and pushes the operation member 110 with the intention to execute the autonomous drive mode. In this case, the control unit 190 may move the operation member 110, which has stopped retracting and has started advancing, forward again before the advancing movement of the operation member 110 is completed, to store the operation member 110 in the storage area. The same applies when the driver pulls the operation member 110 that is moving toward the storage area merely by mistake or with no intention. That is, in the case where the driver pulls the retracting operation member 110 by mistake and the operation member 110 has started moving back to the normal position, he or she can push the advancing operation member 110 forward to store the operation member 110 in the storage area.

When the external force detection unit 180 detects an external force applied to the moving operation member 110, the control unit 190 may first stop the operation member 110, and when the external force detection unit 180 detects an external force again, the control unit 190 may increase or decrease the moving speed of the operation member 110 according to the direction of the external force. For example, it is assumed that an external force in the opposite direction is applied to the forward moving operation member 110 as shown in (a) of FIG. 6. In this case, the control unit 190 may control the moving unit 170 to stop (immediately stop) the operation member 110, and when an external force in the opposite direction is applied again thereafter, the control unit 190 may move the operation member 110 rearward. That is, when the driver repeats the same operation (in this case, the operation of pulling the operation member 110 rearward) twice, the movement of the operation member 110 may be controlled according to the direction of the external force applied by this operation, in response to this repeated operation performed by the driver. The driver's intention can thus be more accurately reflected in controlling the movement of the operation member 110.

As described above, when an external force is applied to the moving operation member 110, the steering system 100 can also control the movement of the operation member 110 using an attribute value of the external force other than the direction of the external force. An example of this operation will be described with reference to FIG. 7.

Figure 7:
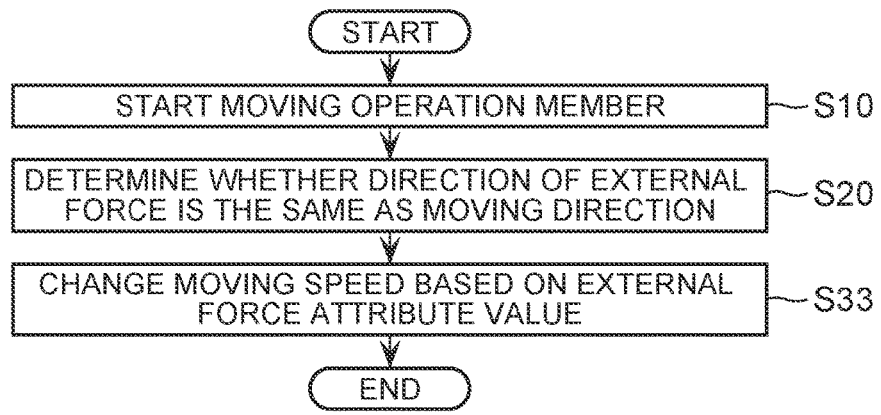
FIG. 7 is a flowchart illustrating a second example of the specific operation of the steering system according to the embodiment.

FIG. 7 is a flowchart illustrating a second example of the specific operation of the steering system 100 according to the embodiment. In the steering system 100 according to the embodiment, the external force detection unit 180 can acquire not only the direction of an external force but also the magnitude and duration of the external force. That is, the external force detection unit 180 can acquire, e.g., the three kinds of external force attribute values including the direction, magnitude, and duration of the external force. The operation of the steering system 100 can thus be controlled so as to reflect the driver's intention more accurately. Namely, the operation of the steering system 100 can be more efficiently controlled.

Specifically, as shown in FIG. 7, the control unit 190 operates the moving unit 170 according to the predetermined operation, etc. The moving unit 170 thus starts moving the operation member 110 (S10). When the external force detection unit 180 detects an external force applied to the moving operation member 110, the determination unit 181 determines whether the direction of the external force is the same as the moving direction of the operation member 110 (S20). The control unit 190 acquires the determination result from the determination unit 181 and acquires an external force attribute value indicating the magnitude or duration of the external force from the external force detection unit 180.

The control unit 190 controls the operation of the steering system 100 using the acquired determination result and external force attribute value (S33). The driver's intention can thus be more accurately conveyed to the steering system 100. Specifically, for example, the control unit 190 controls the moving unit 170 to change the moving speed of the operation member 110 to a moving speed according to the acquired external force attribute value (S33).

More specifically, for example, when the magnitude of the external force acquired as the external force attribute value is F1, the control unit 190 increases the moving speed of the operation member 110 by V1 from its normal moving speed. When the magnitude of the external force is F2 (F2>F1), the control unit 190 increases the moving speed of the operation member 110 by V2 (V2>V1) from the normal moving speed. In this case, the driver can change the subsequent moving speed of the operation member 110 to a speed according to his or her intention by adjusting the pushing or pulling force he or she applies to the operation member 110.

For example, when the duration of the external force acquired as the external force attribute value is T1, the control unit 190 increases the moving speed of the operation member 110 by V1 from the normal moving speed. When the duration of the external force is T2 (T2>T1), the control unit 190 increases the moving speed of the operation member 110 by V2 (V2>V1) from the normal moving speed. In this case, the driver can change the subsequent moving speed of the operation member 110 to a speed according to his or her intention by adjusting the time during which he or she pushes or pulls the operation member 110.

As described above, in the embodiment, the external force detection unit 180 detects the external force attribute value that includes at least one of the magnitude and duration of the external force in addition to the direction of the external force. When changing the moving speed of the operation member 110 in controlling the operation of the steering system 100, the control unit 190 acquires the external force attribute value detected by the external force detection unit 180 and controls the moving unit 170. The control unit 190 can thus change the moving speed of the operation member 110 to a speed based on the external force attribute value.

The steering system 100 can thus adjust the moving speed of the operation member 110 in view of at least one of the magnitude and duration of the external force applied to the moving operation member 110, in addition to the direction of the external force. As a result, the operation of the steering system 100 can be controlled so as to reflect the driver's intention more accurately. That is, the operation of the steering system 100 can be more efficiently controlled.

3-1. More Detailed Functional Configuration Example of Steering System

Figure 8:
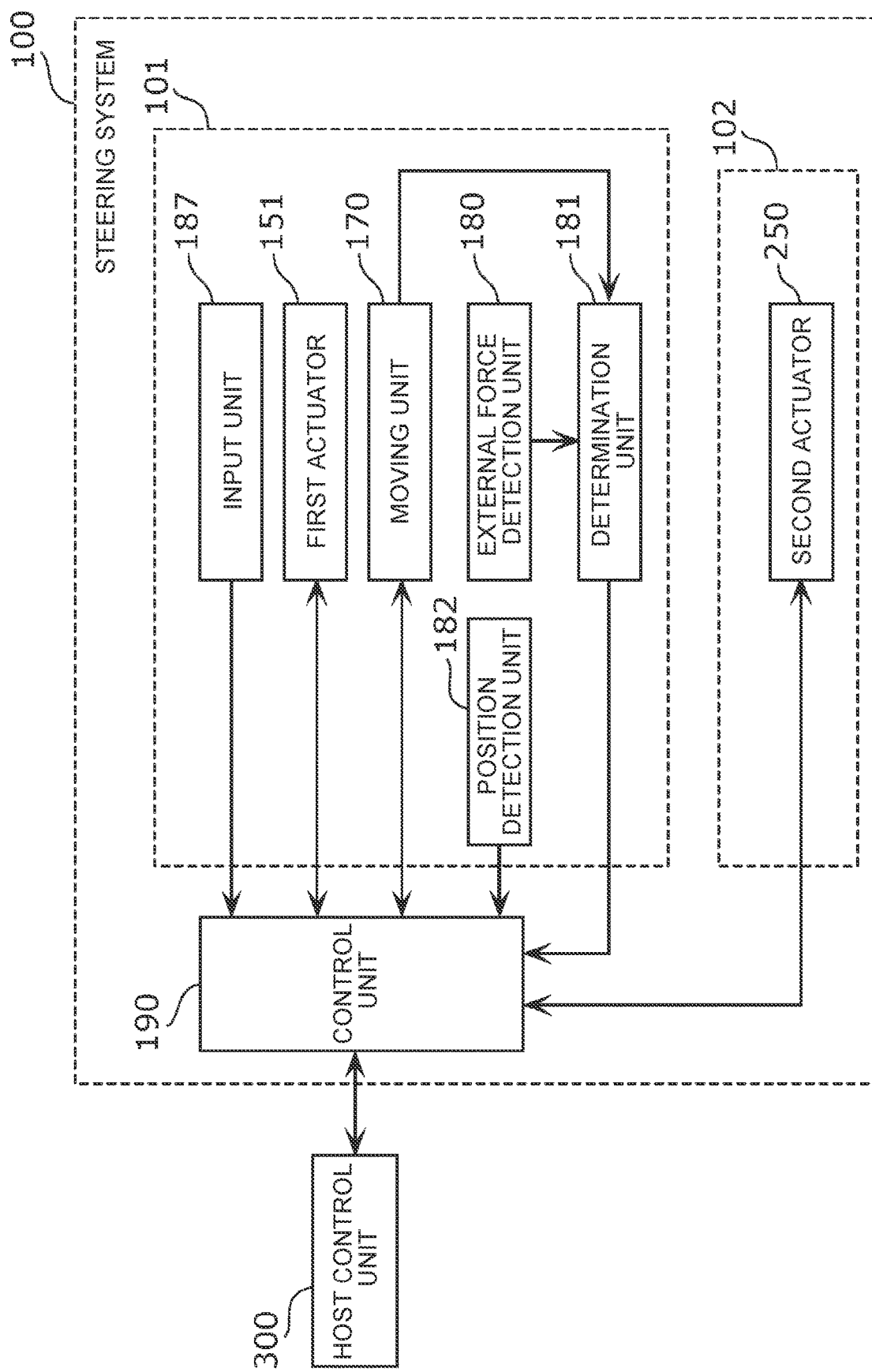
FIG. 8 is a block diagram illustrating an example of a more detailed functional configuration of the steering system according to the embodiment.
Figure 9:
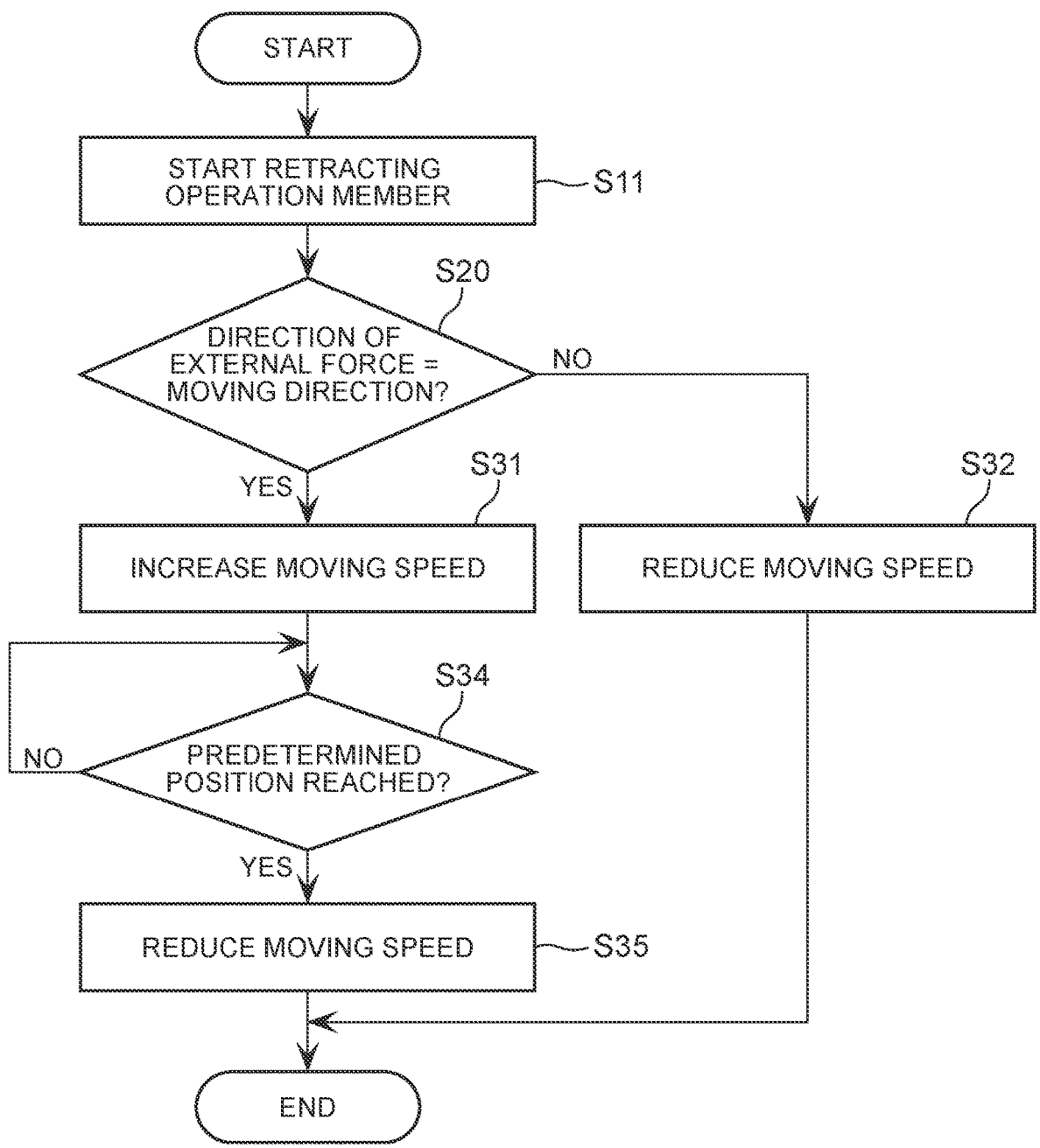
FIG. 9 is a flowchart illustrating a third example of the specific operation of the steering system according to the embodiment.

FIG. 8 is a block diagram illustrating an example of a more detailed functional configuration of the steering system 100 according to the embodiment. As shown in FIG. 8, the steering system 100 includes a position detection unit 182 and an input unit 187 in addition to the control unit 190, the external force detection unit 180, the determination unit 181, the first actuator 151, and the second actuator 250 that are shown in FIGS. 1 to 3. The position detection unit 182 is a device that detects the position of the operation member 110. The position detection unit 182 can detect the position of the operation member 110 relative to a predetermined reference position by, e.g., using an encoder value of the slide motor 172 of the moving unit 170 or analyzing a captured image of the operation member 110. The input unit 187 is a device that can accept an input by the driver and operates according to the input. Examples of the input unit 187 include turn signals, a horn, and various touch panels and switches. A specific example of the operation of the steering system 100 configured as described above will be described. 3-2. Specific Examples of Operation of Steering System The steering system 100 according to the embodiment can also reduce the moving speed of the operation member 110 according to the position of the operation member 110 in the case where the steering system 100 increases the moving speed of the operation member 110 in response to detection of an external force applied to the operation member 110 that is being retracted to the storage area. An example of this operation will be described with reference to FIG. 9. FIG. 9 is a flowchart illustrating a third example of the specific operation of the steering system 100 according to the embodiment.

As shown in FIG. 9, the control unit 190 operates the moving unit 170 according to the predetermined operation, etc. The moving unit 170 thus starts moving (retracting) the operation member 110 forward (S11). When the external force detection unit 180 detects an external force applied to the retracting operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 controls the moving unit 170 to increase the moving speed of the operation member 110 (S31). When the determination unit 181 determines that the direction of the external force is not the same as the moving direction of the operation member 110 (No in S20), the control unit 190 controls the moving unit 170 to reduce the moving speed of the operation member 110 (S32). In the case where the moving speed of the operation member 110 is increased (S31), the control unit 190 reduces the moving speed of the operation member 110 (S35) when the position of the operation member 110 acquired from the position detection unit 182 reaches a predetermined position (Yes in S34).

Specifically, as described above, the operation member 110 is stored in the storage area in the dashboard that is an example of the vehicle member. Accordingly, the distance between the dashboard and the operation member 110 is reduced as the operation member 110 is stored in the storage area. The driver may therefore get his or her finger, etc. caught between the dashboard and the operation member 110. Accordingly, in the embodiment, the moving speed of the operation member 110 is reduced when the operation member 110 reaches, e.g., a predetermined position close to the dashboard (about several to ten centimeters from the dashboard). That is, the moving speed of the operation member 110 that has been increased based on the detection result of the external force is reduced when the operation member 110 approaches the dashboard. The problem that, for example, the driver's finger is caught between the operation member 110 and the dashboard is therefore less likely to occur.

As described above, the steering system 100 according to the embodiment includes the position detection unit 182 that detects the position of the operation member 110. In the case where the control unit 190 has increased the moving speed of the operation member 110 based on the determination result while the operation member 110 is moving toward the storage area, the control unit 190 can reduce the moving speed of the operation member 110 when the control unit 190 acquires from the position detection unit 182 the detection result indicating that the operation member 110 has reached a position that is a predetermined distance away from the dashboard defining the storage area. The operation member 110 is thus efficiently moved according to the driver's intention and the driver's safety is also ensured.

Figure 10:
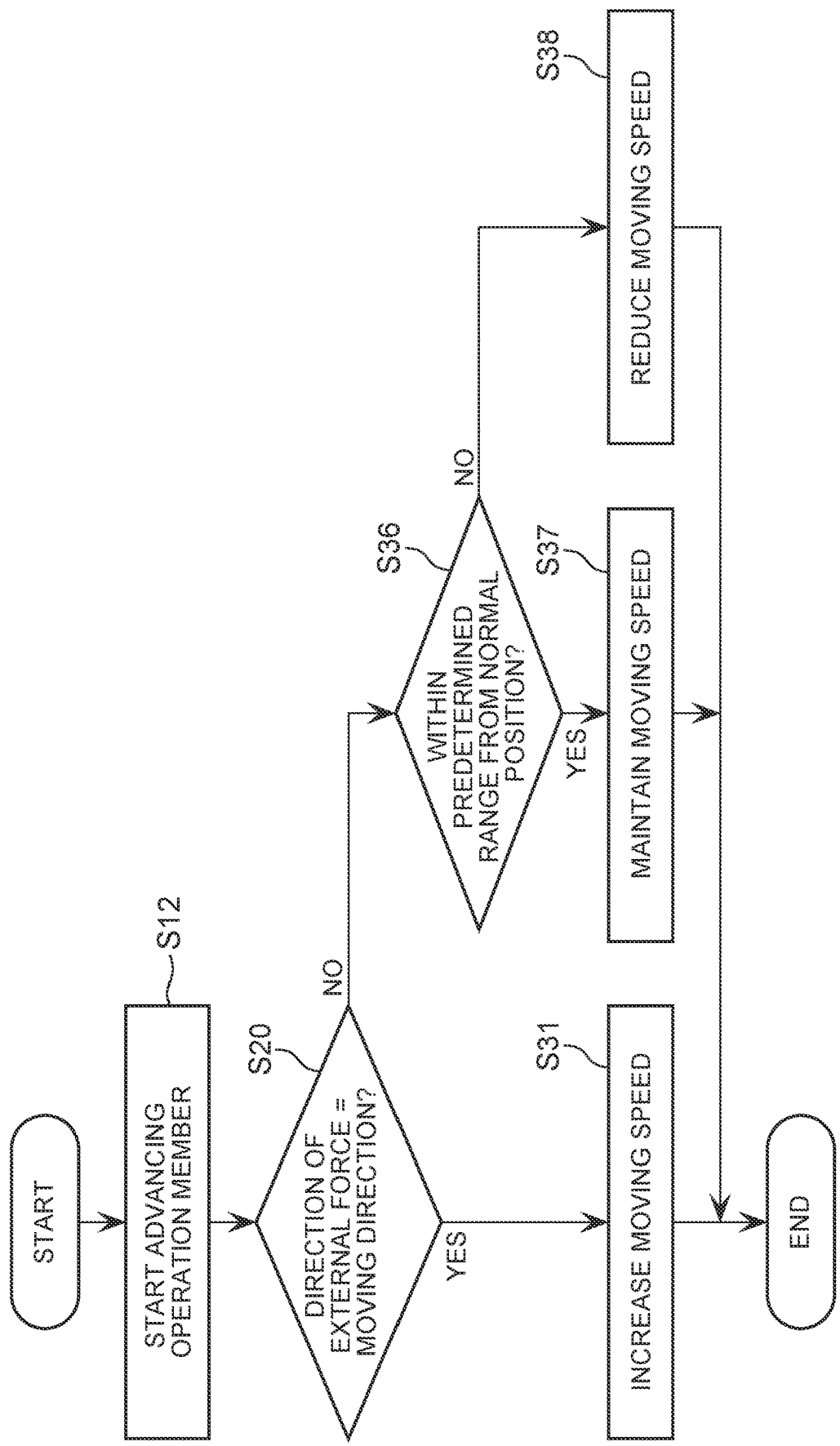
FIG. 10 is a flowchart illustrating a fourth example of the specific operation of the steering system according to the embodiment.

Even when the operation member 110 is advanced to the normal position, the operation of the steering system 100 according to the embodiment can be efficiently controlled by using the detection result regarding the position of the operation member 110 acquired from the position detection unit 182. An example of this operation will be described with reference to FIG. 10. FIG. 10 is a flowchart illustrating a fourth example of the specific operation of the steering system 100 according to the embodiment.

As shown in FIG. 10, the control unit 190 operates the moving unit 170 according to the predetermined operation, etc. The moving unit 170 thus starts moving (advancing) the operation member 110 rearward (S12). When the external force detection unit 180 detects an external force applied to the advancing operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 controls the moving unit 170 to increase the moving speed of the operation member 110 (S31). When the determination unit 181 determines that the direction of the external force is not the same as the moving direction of the operation member 110 (No in S20), the control unit 190 determines whether the position of the operation member 110 acquired from the position detection unit 182 is within a predetermined range from the normal position (S36). When the control unit 190 determines that the position of the operation member 110 is within the predetermined range from the normal position (Yes in S36), the control unit 190 controls the moving unit 170 to maintain the moving speed of the operation member 110 and move the operation member 110 to the normal position (S37). When the control unit 190 determines that the position of the operation member 110 is not within the predetermined range from the normal position (No in S36), the control unit 190 reduces the moving speed of the operation member 110 (S38). In this case, the control unit 190 reduces the rearward moving speed of the operation member 110 to, e.g., a negative value. As a result, the operation member 110 is moved forward and retracted to the storage area (see, e.g., (b) of FIG. 6).

For example, it is assumed that, when the manual drive mode is started or resumed, an external force in the opposite direction (forward direction) is detected after the operation member 110 has started advancing toward the normal position. In this case, it is presumed that the driver is refusing to start manual driving as described above. However, in the case where an external force in the opposite direction (forward direction) is detected when the operation member 110 has advanced to a position close to the normal position (within the range of about several to ten centimeters from the normal position), it is presumed that this external force is generated, for example, because the driver prepared for manual driving holds the operation member 110. In this case, the steering system 100 according to the embodiment maintains the moving speed of the operation member 110 and advances the operation member 110 to the normal position, instead of reducing the moving speed of the operation member 110. The driver can thus quickly start manual driving.

As described above, the steering system 100 according to the embodiment includes the position detection unit 182 that detects the position of the operation member 110. Even when the control unit 190 acquires the determination result indicating that the direction of the external force is not the same as the moving direction of the operation member 110 while the operation member 110 is moving toward the normal position, it is possible not to reduce the moving speed of the operation member 110 when the control unit 190 acquires from the position detection unit 182 the detection result indicating that the operation member 110 is located within the predetermined range from the normal position. The operation member 110 is thus efficiently moved according to the driver's intention.

Figure 11:
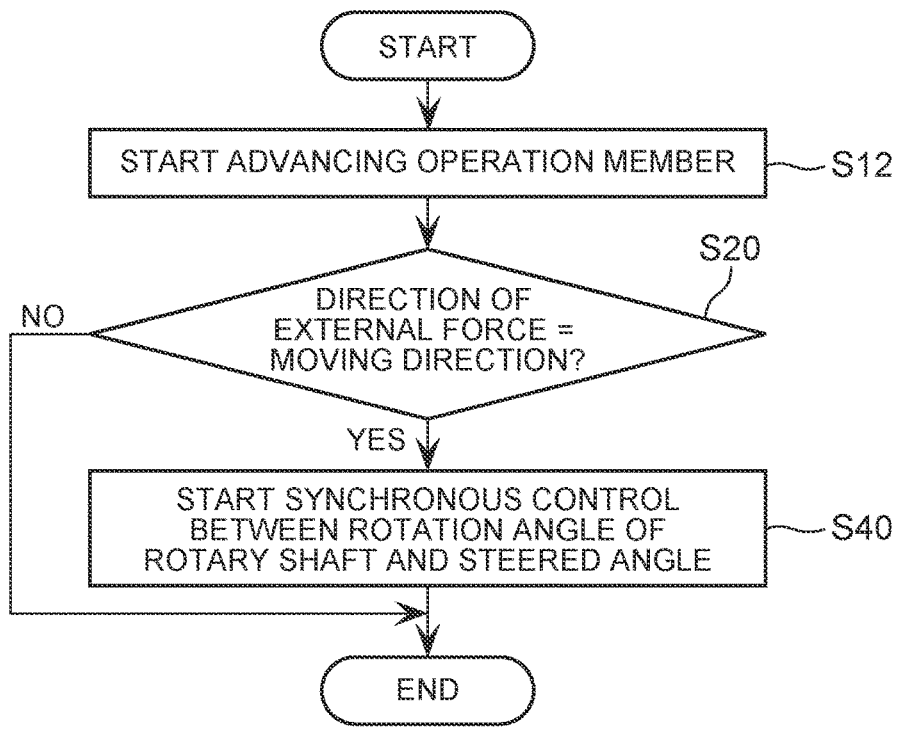
FIG. 11 is a flowchart illustrating a fifth example of the specific operation of the steering system according to the embodiment.
Figure 12:
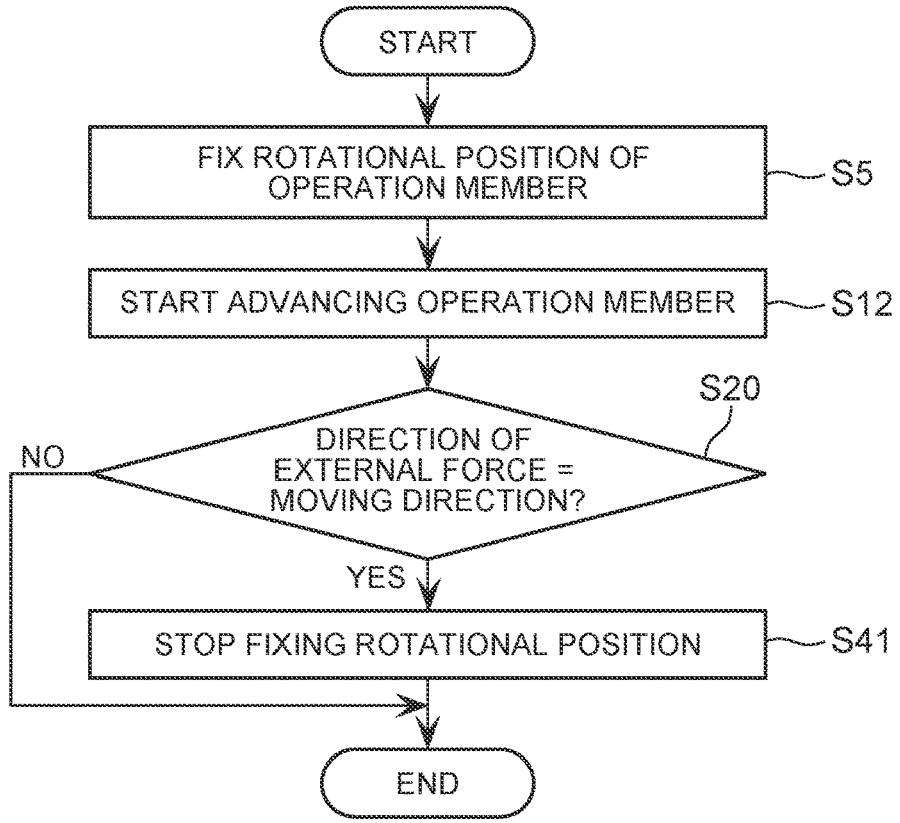
FIG. 12 is a flowchart illustrating a sixth example of the specific operation of the steering system according to the embodiment.

In the steering system 100 according to the embodiment, other types of control can be performed in addition to, or instead of, the control of the moving speed of the operation member 110 in order to control the operation of the steering system 100 based on the determination result from the determination unit 181. Examples of this operation will be described with reference to FIGS. 11 to 13. FIGS. 11 to 13 are flowcharts illustrating fifth to seventh examples of the specific operation of the steering system 100 according to the embodiment.

As shown in FIG. 11, the control unit 190 operates the moving unit 170 according to the predetermined operation, etc. The moving unit 170 thus starts moving (advancing) the operation member 110 rearward (S12). When the external force detection unit 180 detects an external force applied to the advancing operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 controls the first actuator 151 to start the synchronous control for controlling the rotation angle of the rotary shaft 112 to the angle corresponding to the steered angle of the steered wheels 210 (S40).

In the steering system 100 according to the embodiment, when the operation member 110 is stored in the storage area, the rotation mechanism unit 130 (see FIG. 2) is also stored in the storage area together with the operation member 110. The operation member 110 is collapsed so as to be parallel to, e.g., the steering axis Aa. Accordingly, the operation member 110 and the structure that is stored in the storage area together with the operation member 110 have an asymmetrical shape (i.e., a non-circular shape) about the steering axis Aa as viewed from the direction of the steering axis Aa. The rotational position of the operation member 110 at the time when the operation member 110 is stored in the storage area is therefore limited. Specifically, when the operation member 110 is stored in the storage area, the operation member 110 is operated in the manual drive mode to the initial rotational position where the steered wheels 210 are in the straight ahead state. For example, when the operation mode is subsequently switched to the manual drive mode while the vehicle is traveling in the autonomous drive mode, it is necessary to perform the synchronous control for controlling the rotational position of the operation member 110 to the rotational position corresponding to the steered angle of the steered wheels 210 at the time when the manual drive mode is started. Specifically, the control unit 190 controls the rotation angle of the rotary shaft 112 that rotates the operation member 110, thereby controlling the rotational position of the operation member 110 to the rotational position corresponding to the steered angle of the steered wheels 210 at that time.

For example, this synchronous control may be performed after the movement of the operation member 110 to the normal position is completed. In this case, however, the driver needs to wait for the completion of the movement of the operation member 110 to the normal position and the completion of the subsequent synchronization control. In the steering system 100 according to the embodiment, when it is determined that the direction of the external force is the same as the moving direction of the operation member 110 in the case where the operation member 110 is advancing to the normal position, the synchronous control can be started in response to this determination result.

As described above, the steering system 100 according to the embodiment includes the first actuator 151 that applies a driving force for rotating the rotary shaft 112 to the rotary shaft 112, and the second actuator 250 that applies a driving force for steering to the steered wheels 210 that are not mechanically coupled to the rotary shaft 112, the steered wheels 210 being included in the vehicle (see FIG. 8). When the control unit 190 acquires, while the operation member 110 is moving toward the normal position, the determination result indicating that the direction of the external force is the same as the moving direction of the operation member 110, the control unit 190 controls the operation of the steering system 100 by controlling the first actuator 151 to start the synchronous control for controlling the rotation angle of the rotary shaft 112 to the angle corresponding to the steered angle of the steered wheels 210 driven by the second actuator 250.

Accordingly, for example, when the driver wants to start operating the operation member 110 as soon as possible and pulls the operation member 110 while the operation member 110 is moving toward the normal position, the synchronous control is started in response to the pulling of the operation member 110. For example, the synchronous control can therefore be completed before the operation member 110 reaches the normal position. As a result, the driver can immediately start manual driving using the operation member 110 without feeling discomfort. In this case, the control unit 190 may also increase the moving speed of the operation member 110 as described above with reference to (d) of FIG. 6. That is, in the case where an external force pulling the operation member 110 toward the normal position is applied to the operation member 110 that is moving toward the normal position, the control unit 190 may increase the moving speed of the operation member 110 and perform the synchronous control for the rotational position of the operation member 110 at the same time.

The first actuator 151 can apply a rotational driving force to fix the rotation angle of the rotary shaft 112 to a predetermined rotation angle. The first actuator 151 can thus function as a rotation fixing unit that fixes the rotational position of the operation member 110. That is, the control unit 190 can fix and stop fixing the rotation angle of the rotary shaft 112 by controlling the first actuator 151 that functions as the rotation fixing unit. An example of this operation will be described with reference to FIG. 12.

As shown in FIG. 12, the control unit 190 fixes the rotational position of the operation member 110 during, e.g., a period in which the operation member 110 is stored in the storage area in order to, e.g., suppress interference between the operation member 110 and other members (S5). In the embodiment, for example, when the rotary shaft 112 tries to rotate with the operation member 110 due to vibration that occurs during traveling, the control unit 190 controls the first actuator 151 to apply a reaction force in the reverse direction to the rotary shaft 112. Rotation of the rotary shaft 112 is thus prevented, and as a result, the rotational position of the operation member 110 is fixed to a predetermined rotational position. In principle, the rotational position of the operation member 110 is fixed to the predetermined position even during a period in which the operation member 110 moves between the storage area and the normal position. Subsequently, the control unit 190 operates the moving unit 170 according to the predetermined operation, etc. to start moving (advancing) the operation member 110 rearward (S12). When the external force detection unit 180 detects an external force applied to the advancing operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 controls the first actuator 151 to stop fixing the rotational position of the operation member 110 (S41). The driver can thus quickly manually operate the operation member 110.

As described above, the steering system 100 according to the embodiment includes the first actuator 151 that functions as the rotation fixing unit that fixes the rotational position of the operation member 110 to the predetermined rotational position. When the control unit 190 acquires the determination result indicating that the direction of the external force is the same as the moving direction of the operation member 110 while the operation member 110 is moving toward the normal position, the control unit 190 controls the first actuator 151 to stop fixing the rotational position of the operation member 110.

Accordingly, for example, when the driver wants to start operating the operation member 110 as soon as possible and pulls the operation member 110 while the operation member 110 is moving toward the normal position, the control unit 190 immediately stops fixing the rotational position of the operation member 110. For example, the driver can therefore start manual driving using the operation member 110 as soon as he or she holds the operation member 110. In this case, the control unit 190 may also increase the moving speed of the operation member 110 as described above with reference to (d) of FIG. 6. That is, in the case where an external force pulling the operation member 110 toward the normal position is applied to the operation member 110 that is moving toward the normal position, the control unit 190 may increase the moving speed of the operation member 110 and stop fixing the rotational position of the operation member 110 at the same time. In this case, the control unit 190 may also perform the synchronous control. That is, in the case where an external force pulling the operation member 110 toward the normal position is applied to the operation member 110 that is moving toward the normal position, the control unit 190 may perform the synchronous control for the rotational position of the operation member 110 and stop fixing the rotational position of the operation member 110 at the same time. Alternatively, for example, the control unit 190 may increase the moving speed of the operation member 110, perform the synchronous control for the operation member 110, and stop fixing the rotational position of the operation member 110 at the same time.

The first actuator 151 need not necessarily function as the rotation fixing unit. The steering system 100 may include, e.g., a lock mechanism unit that moves a member that engages with the rotary shaft 112 in the circumferential direction when controlled by the control unit 190. In this case, the lock mechanism unit can have the function of the rotation fixing unit to fix and stop fixing the rotation angle of the rotary shaft 112.

The steering system 100 according to the embodiment can also control the input unit 187 that is the turn signals, the horn, or the like based on the determination as to whether the direction of an external force applied to the operation member 110 is the same as the moving direction of the operation member 110. An example of this operation will be described with reference to FIG. 13.

As shown in FIG. 13, the control unit 190 disables the input unit 187 such as the turn signals while, for example, the vehicle is traveling in the autonomous drive mode in order to prevent a malfunction or erroneous operation of the input unit 187 (S6). Accordingly, even if the turn signal lever is operated while the vehicle is traveling in the autonomous drive mode, the turn signals do not operate according to the operation of the turn signal lever. When the operation mode is subsequently switched from the autonomous drive mode to the manual drive mode, the control unit 190 operates the moving unit 170 to start moving (advancing) the operation member 110 rearward (S12). When the external force detection unit 180 detects an external force applied to the advancing operation member 110, the determination unit 181 determines whether the direction of the external force is the same as the moving direction of the operation member 110 (S20). When the determination unit 181 determines that the direction of the external force is the same as the moving direction of the operation member 110 (Yes in S20), the control unit 190 enables the disabled input unit 187 (S42). The driver can thus quickly operate the input unit 187.

As described above, the steering system 100 according to the embodiment includes the input unit 187 that can accept an input by the driver and operate according to the input. The control unit 190 can switch between the manual drive mode in which steering of the steered wheels 210 of the vehicle is driven based on the operation of the operation member 110 by the driver and the autonomous drive mode in which steering of the steered wheels 210 is driven based on an instruction that is generated without depending on the operation of the operation member 110 by the driver. In the autonomous drive mode, the control unit 190 disables the input unit 187 so as not to allow the input unit 187 to accept the input by the driver. In the case where the control unit 190 acquires, while the input unit 187 is in the disabled state and the operation member 110 is moving toward the normal position, the determination result indicating that the direction of the external force is the same as the moving direction of the operation member 110, the control unit 190 enables the disabled input unit 187.

Accordingly, for example, when the driver wants to start operating the operation member 110 as soon as possible and pulls the operation member 110 while the operation member 110 is moving toward the normal position, the control unit 190 immediately enables the disabled input unit 187. For example, the driver can therefore start operating the turn signals, or honk the horn, as soon as he or she holds the operation member 110. In this case, the control unit 190 may also increase the moving speed of the operation member 110 as described above with reference to (d) of FIG. 6. That is, in the case where an external force pulling the operation member 110 toward the normal position is applied to the operation member 110 that is moving toward the normal position, the control unit 190 may increase the moving speed of the operation member 110 and enable the input unit 187 at the same time.

In the case where the operation member 110 is pulled during a period in which the operation member 110 disabled in the autonomous drive mode is being moved toward the normal position, the steering system 100 may immediately enable the operation member 110. That is, the control unit 190 can switch between the manual drive mode in which steering of the steered wheels 210 of the vehicle is driven based on the operation of the operation member 110 by the driver and the autonomous drive mode in which steering of the steered wheels 210 is driven based on an instruction that is generated without depending on the operation of the operation member 110 by the driver. In the autonomous drive mode, the control unit 190 disables the operation member 110 so as not to allow the operation member 110 to accept the operation by the driver. In the case where the control unit 190 acquires, while the operation member 110 is in the disabled state and is moving toward the normal position, the determination result indicating that the direction of the external force is the same as the moving direction of the operation member 110, the control unit 190 enables the disabled operation member 110. That is, driving of the vehicle according to the operation of the operation member 110 by the driver, namely the manual drive mode, is started.

Accordingly, for example, when the driver wants to start operating the operation member 110 as soon as possible and pulls the operation member 110 while the operation member 110 is moving toward the normal position, the control unit 190 immediately enables the disabled operation member 110. For example, the driver can therefore start driving (manually driving) the vehicle using the operation member 110 as soon as he or she holds the operation member 110. In this case, the control unit 190 may also increase the moving speed of the operation member 110 as described above with reference to (d) of FIG. 6. That is, in the case where an external force pulling the operation member 110 toward the normal position is applied to the operation member 110 that is moving toward the normal position, the control unit 190 may increase the moving speed of the operation member 110 and enable the operation member 110 at the same time.

Other Embodiments

The steering system according to the disclosure is described above based on the embodiment. However, the disclosure is not limited to the above embodiment. Various modifications that can be made to the above embodiment by those skilled in the art and forms using any combination of two or more of the components described above without departing from the scope of the disclosure are within the scope of the disclosure.

For example, the steering system 100 need not necessarily include the rotation mechanism unit 130. That is, advancing and retracting of the operation member 110 need not necessarily involve rotation of the operation member 110 about the rotation axis Ab extending in the lateral direction of the vehicle. The operation member 110 can still be stored in the storage area in, for example, the dashboard located in front of the driver's seat. When the operation member 110 is stored in the storage area, a member that supports the operation member 110 and that is non-circular as viewed in the direction of the steering axis Aa may also be stored in the storage area. In this case, the rotational position of the operation member 110 when stored in the storage area is limited. Accordingly, the rotational position of the operation member 110 at the time when the operation member 110 is advanced from the storage area may not correspond to the steered angle of the steered wheels 210 at that time. Accordingly, in this case as well, performing the synchronous control for the rotational position of the operation member 110 while the operation member 110 is advancing toward the normal position is effective for efficiently controlling the operation of the steering system 100, as described above with reference to, e.g., FIG. 11.

The function of the control unit 190 to control the steering mechanism unit 101 including the first actuator 151, etc. and the function of the control unit 190 to control the steering operation mechanism unit 102 including the second actuator 250, etc. may be implemented by separate computers. That is, the control unit 190 according to the embodiment may be implemented by a first control unit that controls the steering mechanism unit 101, a second control unit that controls the steering operation mechanism unit 102, and a main control unit that controls the first control unit and the second control unit. The first control unit may have a function to control the second control unit. That is, the control unit 190 according to the embodiment may be implemented by the first control unit and the second control unit. The configuration of hardware and software for controlling the steering system 100 is not particularly limited, and the arrangement thereof is also not particularly limited.

The mechanism for moving the operation member 110 in the longitudinal direction need not necessarily be the sliding mechanism. For example, the operation member 110 may be moved between the storage area and the normal position by collapsing and deploying an arm with one or more joints that integrally supports the mechanism unit including the operation member 110, etc.

The operation member 110 need not necessarily have such an annular shape as shown in FIG. 1. For example, the operation member 110 may have a U-shape or an H-shape that lacks a part of its upper end and/or lower end, etc. in FIG. 2. That is, the shape and size of the operation member 110 are not particularly limited as long as the driver can hold the operation member 110 in the manual drive mode in such a manner that he or she can drive the vehicle.

The disclosure is useful as a steering system which can increase the space in front of the driver and whose operation can be efficiently controlled. The disclosure is therefore applicable to vehicles including wheels, continuous tracks, or the like, such as passenger vehicles, buses, trucks, agricultural machines, and construction equipment, the vehicles being capable of being driven both manually and autonomously.

What is claimed is:

1. A steering system configured to steer a vehicle, the steering system comprising:
    a rotary shaft to which an operation member is coupled;
    a moving unit configured to move the operation member between a normal position that is a position where the operation member is manually operated by a driver of the vehicle, and a storage area located ahead of the normal position in a forward direction of the vehicle;
    an external force detection unit configured to detect an external force externally applied to the operation member while the operation member is being moved by the moving unit;
    a determination unit configured to determine whether a direction of the external force detected by the external force detection unit is the same as a moving direction in which the operation member is being moved by the moving unit; and
    a control unit configured to control the moving unit based on a determination result from the determination unit.

2. The steering system according to claim 1, wherein the control unit is configured to control the moving unit to increase or reduce a moving speed of the operation member based on the determination result from the determination unit.

3. The steering system according to claim 2, wherein the control unit is configured to control the moving unit to reduce the moving speed of the operation member when the determination result from the determination unit indicates that the direction of the external force is not the same as the moving direction of the operation member.

4. The steering system according to claim 2, wherein the control unit is configured to control the moving unit to increase the moving speed of the operation member when the determination result from the determination unit indicates that the direction of the external force is the same as the moving direction of the operation member.

5. The steering system according to claim 2, wherein:
    the external force detection unit is further configured to detect an external force attribute value that includes at least one of magnitude and duration of the external force; and
    the control unit is further configured to acquire the external force attribute value detected by the external force detection unit and control the moving unit to change the moving speed of the operation member to a speed based on the external force attribute value, when the control unit changes the moving speed of the operation member.

6. The steering system according to claim 2, further comprising
    a position detection unit configured to detect a position of the operation member, wherein the control unit is configured to reduce the moving speed of the operation member when the control unit acquires, from the position detection unit, a detection result indicating that the operation member has reached a position that is a predetermined distance away from a vehicle member defining the storage area in a case where the control unit has increased the moving speed of the operation member based on the determination result while the operation member is moving toward the storage area.

7. The steering system according to claim 2, further comprising
    a position detection unit configured to detect a position of the operation member, wherein the control unit is configured not to reduce the moving speed of the operation member when the control unit acquires, from the position detection unit, a detection result indicating that the operation member is located within a predetermined range from the normal position even in a case where the control unit acquires the determination result indicating that the direction of the external force is not the same as the moving direction of the operation member while the operation member is moving toward the normal position.

8. The steering system according to claim 1, further comprising:
    a first actuator configured to apply a driving force for rotating the rotary shaft to the rotary shaft; and
    a second actuator configured to apply a driving force for steering to steered wheels of the vehicle that are not mechanically coupled to the rotary shaft, wherein the control unit is configured to control operation of the steering system by controlling the first actuator to start synchronous control when the control unit acquires the determination result indicating that the direction of the external force is the same as the moving direction of the operation member while the operation member is moving toward the normal position, the synchronous control being control in which a rotation angle of the rotary shaft is controlled to an angle corresponding to a steered angle of the steered wheels driven by the second actuator.

9. The steering system according to claim 1, further comprising
a rotation fixing unit that fixes a rotational position of the operation member to a predetermined rotational position, wherein the control unit is configured to stop fixing the rotational position of the operation member by the rotation fixing unit when the control unit acquires the determination result indicating that the direction of the external force is the same as the moving direction of the operation member while the operation member is moving toward the normal position.

10. The steering system according to claim 1, further comprising
an input unit configured to accept an input by the driver and operate according to the input, wherein:
the control unit is configured to switch between a manual drive mode in which steering of steered wheels of the vehicle is driven based on an operation of the operation member by the driver and an autonomous drive mode in which the steering of the steered wheels is driven based on an instruction generated without depending on the operation of the operation member by the driver;
the control unit is configured to disable the input unit in the autonomous drive mode so as not to allow the input unit to accept the input by the driver; and
the control unit is configured to enable the input unit that has been disabled when the control unit acquires, while the input unit is in a disabled state and the operation member is moving toward the normal position, the determination result indicating that the direction of the external force is the same as the moving direction of the operation member.

11. The steering system according to claim 1, wherein:
the control unit is configured to switch between a manual drive mode in which steering of steered wheels of the vehicle is driven based on an operation of the operation member by the driver and an autonomous drive mode in which the steering of the steered wheels is driven based on an instruction generated without depending on the operation of the operation member by the driver;
the control unit is configured to disable the operation member in the autonomous drive mode so as not to allow the operation member to accept the operation by the driver; and
the control unit is configured to enable the operation member that has been disabled when the control unit acquires, while the operation member is in a disabled state and is moving toward the normal position, the determination result indicating that the direction of the external force is the same as the moving direction of the operation member.

* * * * *